US012782136B2

(12) United States Patent
Wheeler et al.

(10) Patent No.: US 12,782,136 B2
(45) Date of Patent: Nov. 3, 2026

(54) NAVIGATION SYSTEMS AND METHODS USING CELESTRIAL AND INERTIAL MEASUREMENT DATA

(71) Applicant: General Dynamics Mission Systems, Inc., Fairfax, VA (US)

(72) Inventors: Thomas J. Wheeler, Tucson, AZ (US); Brian Michels, Hancock, MA (US)

(73) Assignee: GENERAL DYNAMICS MISSION SYSTEMS, INC., Fairfax, VA (US)

( * ) Notice: Subject to any disclaimer, the term of this patent is extended or adjusted under 35 U.S.C. 154(b) by 157 days.

(21) Appl. No.: 18/582,379

(22) Filed: Feb. 20, 2024

(65) Prior Publication Data

US 2025/0264333 A1 Aug. 21, 2025

(51) Int. Cl.
*G01C 21/02* (2006.01)
*G01C 21/00* (2006.01)

(52) U.S. Cl.
CPC ........... *G01C 21/02* (2013.01); *G01C 21/005* (2013.01)

(58) Field of Classification Search
CPC .............................. G01C 21/02; G01C 21/005
See application file for complete search history.

(56) References Cited

U.S. PATENT DOCUMENTS 7,835,826 B1 * 11/2010 Weigl ..................... B64G 1/245 701/4
9,423,484 B2 8/2016 Aycock et al.
2014/0022539 A1 * 1/2014 France ..................... G01C 3/08 701/1
2020/0174094 A1 * 6/2020 Tchilian .................. G01S 5/163
2020/0386551 A1 * 12/2020 Gavrilets ............. G01C 21/025
2021/0323644 A1 * 10/2021 DeWeert ................. B63B 49/00
2024/0401953 A1 * 12/2024 Li ........................ G01C 21/025

FOREIGN PATENT DOCUMENTS

CN 104075713 A * 10/2014 ........... G01C 21/165

OTHER PUBLICATIONS

Otsu, N., "A Threshold Selection Method from Gray-Level Histograms," IEEE Transactions on Systems, Man and Cybernetics, Jan. 1979, pp. 62-66, vol. SMC-9, No. 1.

(Continued)

*Primary Examiner* — Scott A Browne
*Assistant Examiner* — Terry C Buse
(74) *Attorney, Agent, or Firm* — Ingrassia Fisher & Lorenz, LLP

(57) ABSTRACT

Methods and systems are provided for determining navigational information for an entity such as a vehicle using celestial measurements. One method involves determining a Kalman gain based at least in part on inertial measurement data at or before a current point in time associated with the celestial measurement data, determining a celestial measurement error based at least in part on a relationship between the celestial measurement data and a prior estimate for the celestial measurement data, determining a current estimated error associated with the location of the entity based at least in part on a prior estimated error associated with the location, the Kalman gain and the celestial measurement error, and determining an updated estimate of the location of the entity based at least in part on the current estimated error and a prior estimate of the location of the entity.

16 Claims, 4 Drawing Sheets

(56) References Cited

OTHER PUBLICATIONS

Spratling, B. B., et al., “A Survey on Star Identification Algorithms,” ResearchGate Algorithms, Jan. 29, 2009, pp. 93-107, vol. 2.
Kolomenkin, M. et al., “A Geometric Voting Algorithm for Star Trackers,” IEEE Transaction on Aerospace and Electronic Systems, May 2008, pp. 441-456, vol. 44, No. 2.
Motari, D., et al., “The Pyramid Star Identification Technique,” ION, 2014, pp. 171-183.
Harvard.edu. “Yale Bright Star Catalog,” Mink, D., Sep. 14, 2010. [Retrieved Online]. Retrieved from internet: <URL: http://tdc-www.harvard.edu/catalogs/bsc5.html>.
Meeus, J., “Astronomical Algorithms”, 2nd ed., Richmond, VA: Willmann-Bell, Inc., 1998.
Wikipedia Foundation, Inc., “Pinhole camera model,” Sep. 14, 2022. [Retrieved Online]. Retrieved from internet: <URL: https://en.wikipedia.org/wiki/Pinhole_camera_model>.
Stellarium Web. “Stellarium Web,” 2022. Chereau, F., et al., [Retrieved Online]. Retrieved from internet: <URL: https://stellarium-web.org/>.
Markley, F. L., “Attitude Determination Using Vector Observations: A Fast Optimal Matrix Algorithm,” The Journal of Astronautical Sciences, 1993, pp. 261-280, vol. 41, No. 2.
Wikipedia Foundation, Inc., “Rayleigh distribution,” Dec. 13, 2022. [Retrieved Online]. Retrieved from internet: <URL: https://en.wikipedia.org/wiki/Rayleigh_distribution>.
Michels, B., “Gimbal Error Estimation,” GDMS, May 10, 2022, Pittsfield, MA.
Enright, J., et al., “Star Tracking for Planetary Rovers,” IEEE Aerospace Conference 2012, pp. 1-13.
Press, W. H., et al., ’Numerical Recipes, Third Edition’, Cambridge University Press, 2007, pp. 206-209 and 219, New York, NY.
Shuster, M. D., “A Survey of Attitude Representation,” The Journal of Astronautical Sciences, pp. 439-517, 1993.
Schaub, h. et al., “Analytical Mechanics of Space Systems, 4th ed”, American Institute of Aeronautics and Astronautics, Inc., 2018, Reston, VA.
Brines, M.L. et al., “Skylight Polarization Patterns and Animal Orientation,” Journal of Experimental Biology, Feb. 1982, pp. 69-91, vol. 96, No. 1.
Grief, S., et al., “A functional role of the sky’s polarization pattern for orientation in the greater mouse-eared bat,” Nature Communications, Jul. 22, 2014.
Kraft, P. et al., “Honeybee navigation: following routes using polarized-light cues,” Philosophical Transactions of the Royal Society, Mar. 12, 2011, vol. 366 No. 1565.
Lompado, A., et al., “Using Atmospheric PolarizationPatterns for Azimuth Sensing” Society of Photo-Optical Instrumentation Engineers, Jun. 3, 2014, vol. 9085.
Norris, H. L. et al., “Trident II (D5) Weapon System Error Analysis Methodology at GEDSD,” General Electric Defense Systems Division (now General Dynamics Mission Systems), Jan. 1988, Pittsfield, MA.
Schutz, B. et a;., Statistical Orbit Determination. Elsevier Science, 2004.

* cited by examiner

NAVIGATION SYSTEMS AND METHODS USING CELESTRIAL AND INERTIAL MEASUREMENT DATA

TECHNICAL FIELD OF THE INVENTION

The subject matter described herein relates generally to navigation systems, and more particularly, embodiments of the subject matter relate to determining relative location and other navigational information using celestial and inertial measurement data.

BACKGROUND OF THE INVENTION

This section provides background information related to the present disclosure which is not necessarily prior art.

Modern navigation often relies on global navigation satellite systems (GNSSs), such as the global positioning system (GPS), which employ a constellation of Earth-orbiting satellites that broadcast position and timing data to Earth-based receivers deployed in terrestrial vehicles, aircraft, ships and in handheld devices. To use the GNSS system for navigation, the GNSS receiver antenna is pointed to the sky, where a plurality of GNSS satellites will typically be visible (in the microwave spectrum). In order to fix a position through triangulation, in normal operation, the receiver antenna must see at least four satellites. Often more than four will be visible, assuming the view of the sky is unobstructed.

In practice, there may be situations where reliance on a GNSS is not possible or desirable. For example, there may be scenarios where radio transmissions are obstructed or attenuated due to physical objects, electromagnetic interference, or the like. In a military or non-civilian context, an adversary may engage in jamming to block GPS reception or otherwise attempt to inhibit navigation using GNSS. In other scenarios, a particular geographic region may lack visibility to the requisite number of satellites to triangulate position.

Accordingly, it is desirable to provide systems and methods for accurate navigation information without reliance on GNSS or other external devices or systems. Other desirable features and characteristics will become apparent from the subsequent detailed description and the appended claims, taken in conjunction with the accompanying drawings and the foregoing technical field and background.

SUMMARY OF THE INVENTION

This section provides a general summary of the disclosure and is not a comprehensive disclosure of its full scope or all of its features.

Methods and systems are provided for determining navigational information for an entity such as a vehicle using celestial measurements. One exemplary method involves obtaining celestial measurement data at a current point in time from a celestial measurement system associated with the entity, obtaining inertial measurement data from an inertial measurement system associated with the entity at or before the current point in time, and in response to obtaining the celestial measurement data: determining a Kalman gain based at least in part on the inertial measurement data, determining a celestial measurement error based at least in part on a relationship between the celestial measurement data at the current point in time and a prior estimate of the celestial measurement data for the current point in time, determining a current estimated error associated with the location of the entity based at least in part on a prior estimated error associated with the location, the Kalman gain and the celestial measurement error, determining an updated estimate of the location of the entity based at least in part on the current estimated error and a prior estimated location of the entity, and providing the updated estimate of the location of the entity to a client.

An apparatus for non-transitory computer-readable medium is also provided. The computer-readable medium has computer-executable instructions stored thereon that, when executed by a processing system associated an entity, cause the processing system to obtain celestial measurement data at a current point in time from a celestial measurement system associated with the entity, obtain inertial measurement data from an inertial measurement system associated with the entity at or before the current point in time, and in response to obtaining the celestial measurement data, the instructions cause the processing system to determine a Kalman gain based at least in part on the inertial measurement data, determine a celestial measurement error based at least in part on a relationship between the celestial measurement data at the current point in time and a prior estimate of the celestial measurement data for the current point in time, determine a current estimated error associated with the location of the entity based at least in part on a prior estimated error associated with the location, the Kalman gain and the celestial measurement error, determine an updated estimate of the location of the entity based at least in part on the current estimated error and a prior estimated location of the entity, and provide the updated estimate of the location of the entity to a client.

A system is also provided that includes an inertial measurement system to obtain inertial measurement data indicative of motion of an entity, a celestial measurement system to obtain celestial measurement data indicative of a current vantage point of the entity at a current point in time, an output interface, and a processing system coupled to the inertial measurement system, the celestial measurement system and the output interface. The processing system is configurable to provide a location service to determine a Kalman gain based at least in part on the inertial measurement data at or before the current point in time associated, determine a celestial measurement error based at least in part on a relationship between the celestial measurement data at the current point in time and a prior estimate of the celestial measurement data for the current point in time, determine a current estimated error associated with the location of the entity based at least in part on a prior estimated error associated with the location, the Kalman gain and the celestial measurement error, determine an updated estimate of the location of the entity based at least in part on the current estimated error and a prior estimated location of the entity, and provide the updated estimate of the location of the entity to a client via the output interface.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, where corresponding reference numerals indicate corresponding parts throughout the several views of the drawings. The particular choice of drawings is not intended to limit the scope of the present disclosure.

DETAILED DESCRIPTION

Figure 1:
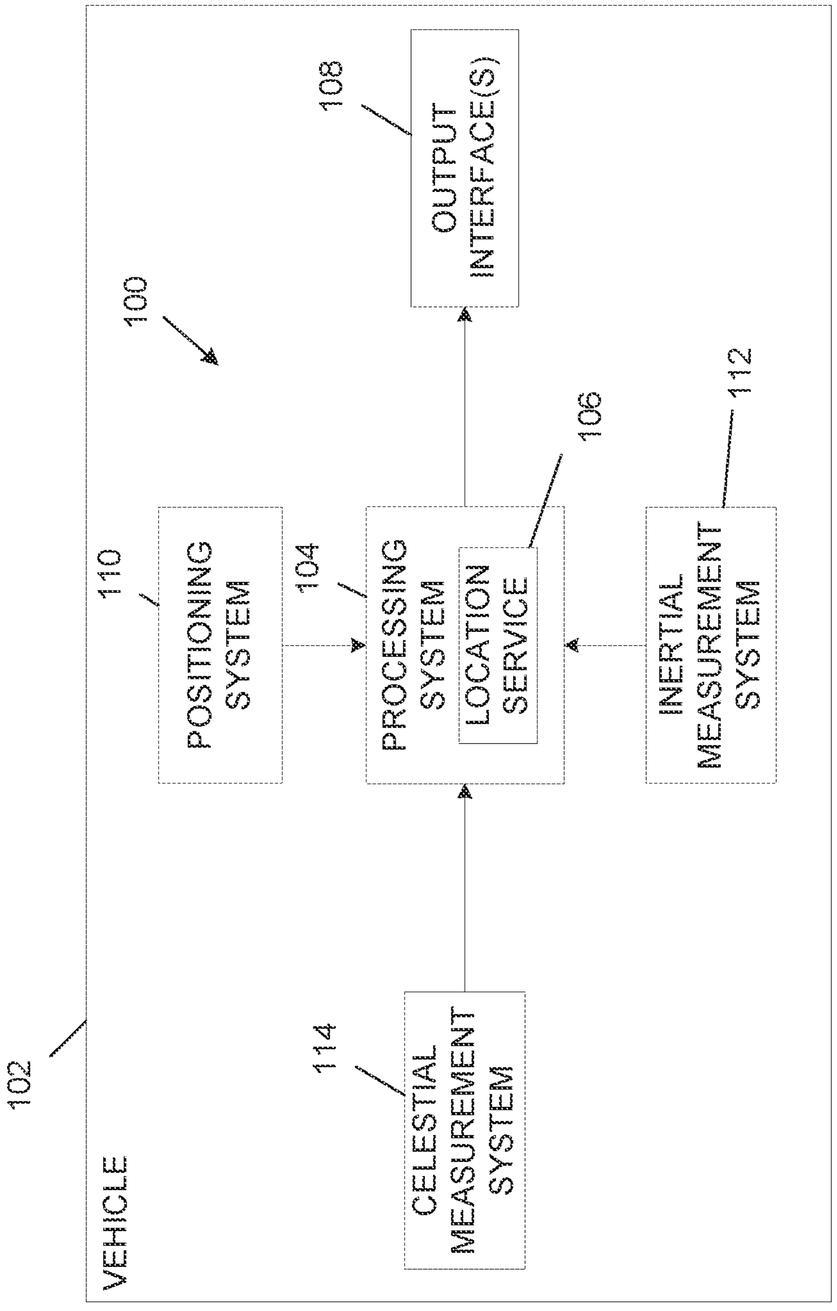
FIG. 1 depicts a block diagram of an exemplary system suitable for determining navigational information for an entity 102 in accordance with one or more exemplary implementations.

The following detailed description is merely exemplary in nature and is not intended to limit the subject matter of the application and uses thereof. Furthermore, there is no intention to be bound by any expressed or implied theory presented in the preceding technical field, background, summary, or the following detailed description.

Embodiments of the subject matter described herein generally pertain to determining the location of an entity, which could be any sort of vehicle or electronic device, as it moves in space with respect to the Earth without reliance on position measurements from global navigation satellite systems (GNSSs) or other direct location measurements. As described in greater detail below, celestial measurement data, such as, for example, the azimuth and elevation of the Sun (or moon), the atmospheric polarization of the ambient sky, astronomical quaternions, and/or the like, is obtained at or for a current point in time from a celestial measurement system associated with the entity, in concert with inertial measurement data for the entity obtained from an inertial measurement system associated with the entity at or before the current point in time associated with the celestial measurement data. The celestial measurement data and the inertial measurement data are input or otherwise provided to a Kalman filter, where the inertial measurement data is utilized to perform a time update or prediction update stage of the Kalman filter to update a covariance matrix for determining a Kalman gain matrix based at least in part on the most recently obtained inertial measurement data. As part of a measurement update stage of the Kalman filter, the relationship between the celestial measurement data at the current point in time and a prior estimate of the celestial measurement data for the current point in time is utilized to determine a celestial measurement error to be multiplied by the Kalman gain matrix to arrive at a current estimated error associated with the location of the entity based at least in part on a prior estimated error associated with the location and the product of the Kalman gain matrix and the celestial measurement error. The current estimated error associated with the location of the entity and a prior estimate of the location of the entity is utilized to determine an updated estimate of the location of the entity. The updated estimate of the location of the entity may then be transmitted or otherwise provided to a client device or service for performing one or more actions based on the updated location of the entity.

By using the celestial measurement data in concert with the inertial measurement data, the accuracy and reliability of the updated estimate of the location of the entity is improved, thereby enabling navigation, geolocation or other actions based on the updated estimate of the location of the entity when a direct measurement of the location would otherwise be unavailable from a GNSS or other position measurement system. In exemplary implementations, the location determination service including the Kalman filter is configurable to support both a daytime operating mode and a nighttime operating mode. In the daytime operating mode, the Kalman filter is configurable to perform a measurement update in response to receiving new or updated celestial measurement data samples pertaining to the Sun, including the azimuth and elevation of the Sun along with the atmospheric polarization of the light or other electromagnetic radiation emitted from the Sun at the location of the entity as measured by a corresponding measurement system associated with the entity. In the nighttime operating mode, the Kalman filter is configurable to perform a measurement update in response to receiving new or updated transformation quaternions corresponding to different arrangements or orientations of stars or other celestial bodies observed at the location of the entity as measured by a corresponding measurement system associated with the entity. In this manner, the location determination service may continue to provide an accurate and reliable estimate of the current geographic location of the entity without reliance on GNSSs or other position measurement systems and independent of the current time of day or the current celestial state at or above the current location of the entity.

FIG. 1 depicts an exemplary system 100 suitable for determining navigational information for an entity 102. For purposes of explanation, the subject matter is described herein in the context of the entity 102 being realized as a vehicle, which may be any sort of ground-based vehicle, marine vessel, aircraft or aerial vehicle, or the like. That said, it should be appreciated that the subject matter described herein is not limited to vehicles, and in practice, the entity 102 may be realized as any sort of electronic device or a subcomponent thereof, such as, for example, mobile devices, navigation devices or systems, head units, and/or the like.

In exemplary implementations, the system 100 includes a processing system 104 configurable to provide a location service 106 capable of determining a geographic location and other navigational information associated with the vehicle 102 and providing the navigational information to one or more output interfaces 108. In exemplary implementations, the vehicle 102 includes or otherwise has associated therewith a positioning system 110, an inertial measurement system 112, and a celestial measurement system 114. The positioning system 110, the inertial measurement system 112, and the celestial measurement system 114 are communicatively coupled to the processing system 104 and suitably configured to support the subject matter described herein.

In practice, the processing system 104 may be realized as any using any suitable processing system, device and/or combination thereof, such as, for example, one or more processors, central processing units (CPUs), controllers, microprocessors, microcontrollers, processing cores and/or other hardware computing resources configured to support the operation of the processing system described herein. The processing system may include or otherwise access a data storage element (or memory) or other non-transitory computer-readable medium capable of storing programming instructions for execution by the processing system, that, when read and executed, are configurable cause processing system to create, generate, or otherwise facilitate the location service 106 based at least in part upon code and other data that is stored or otherwise maintained by the memory and configurable to support the subject matter described herein.

The positioning system 110 generally represents a GPS receiver, a GNSS receiver, or other device or system capable of providing measurement data indicative of the geographic position of the vehicle 102. For example, when the positioning system 110 is realized as a GPS receiver, the positioning system 110 may periodically output or otherwise provide geographic position measurement data including the latitude, longitude, and altitude of the positioning system 110.

The inertial measurement system 112 generally represents the inertial measurement unit (IMU) or other components associated with the vehicle 102 that are configurable to provide inertial measurement data indicative of one or more of the angular rate, specific force, orientation and/or other inertial forces or moments associated with the vehicle 102. For example, in one or more implementations, the inertial measurement system 112 includes one or more accelerometers to provide measurement data indicative of the linear acceleration of the vehicle 102 and one or more gyroscopes or gyrometers to provide measurement data indicative of the rotational rate of movement of the vehicle 102. In this regard, the inertial measurement data output by the inertial measurement system 112 may include measured acceleration samples or values for linear accelerations in three-dimensions with respect to the body of the vehicle 102 along with measured roll, pitch and yaw samples or values for angular rotation in three-dimensions with respect to the body of the vehicle 102. Some implementations of the inertial measurement system 112 may include magnetometers or other devices configurable to provide measurement data indicative of a heading associated with the vehicle 102.

The celestial measurement system 114 generally represents the components associated with the vehicle 102 that are configurable to provide celestial measurement data indicative of one or more characteristics of the atmosphere, sky or celestial objects observable from the current location of the vehicle 102. In this regard, the celestial measurement system 114 may include one or more cameras or image sensors, optical sensors, electromagnetic sensors and/or the like, along with lenses, filters or other optical devices and corresponding electronic components for converting sensed electromagnetic signals into corresponding measurement data. For example, in exemplary implementations, to support daytime operation of the location service 106, the celestial measurement system 114 includes a solar sensor or sun sensor including a camera and one or more lenses configurable to capture a region of the sky or atmosphere above the vehicle 102 and provide corresponding solar position measurement data indicative of the azimuth and elevation of the Sun in relation to the current location of the vehicle 102. Additionally, in exemplary implementations, the celestial measurement system 114 includes a polarization sensor that is configured to provide polarization measurement data indicative of the polarization of the visible light emitted by the Sun within sky or atmosphere above the vehicle 102. As described in greater detail, in exemplary implementations, in response to updated celestial measurement data including solar position and measurement data samples from the celestial measurement system 114 while in the daytime mode, the location service 106 is configured to perform a Kalman filter measurement update to determine an updated estimate of the current location of the vehicle 102 using the celestial measurement data.

To support nighttime operation of the location service 106, the celestial measurement system 114 includes one or more cameras or image sensors configured to capture a region of the sky or atmosphere above the vehicle 102 and subsequent image processing components that are configurable to measurement data indicative of the current location of the vehicle 102 in the form of one or more astronomical quaternions for converting or otherwise translating the observed arrangement of stars or other celestial objects to a corresponding geographic location based on the known locations of those stars or other celestial objects with respect to Earth. In this regard, the image processing components of the celestial measurement system 114 are configurable to perform thresholding or other filtering to limit the portions of image data for analysis to the brightest subset of stars before performing one or more centroiding operations to estimate the center locations of the observed stars satisfying the thresholding and/or other filtering criteria. Based on the spatial relationship between respective pairs or subsets of the observed stars, the observed stars may be mapped to known stars maintained in a catalog or other database of stars, with the known locations of those identified stars being utilized to derive a quaternion for transforming the image data from the reference frame associated with the camera or imaging device into an inertial reference frame where observed stars exhibit the respective spatial relationships between respective pairs or subsets of the observed stars. As described in greater detail, in exemplary implementations, in response to updated astronomical transformation quaternions from the celestial measurement system 114 while in the nighttime mode, the location service 106 is configured to perform a Kalman filter measurement update to determine an updated estimate of the current location of the vehicle 102 using the quaternions in concert with the inertial measurement data from the inertial measurement system 112. It should be noted that although the subject matter may be described herein in the context of the image processing for the nighttime mode residing at the celestial measurement system 114, in other implementations, the image processing for the nighttime mode may be implemented by or at the processing system 104 (e.g., as part of or in concert with the location service 106), in which case the celestial measurement system 114 may merely provide image data to the processing system 104 for analysis.

The output interface(s) 108 generally represent the hardware, software, firmware and/or other components of the system 100 that receive or otherwise obtain the geolocation data (or geopositioning data) determined by the location service 106 to support performing additional actions related to navigation or operation of the vehicle 102 based on the current location of the vehicle 102. For example, in some implementations, the output interface 108 may be realized as a display system, an infotainment system, or another component associated with the vehicle 102 that is configurable to generate one or more graphical user interface (GUI) displays using the current location of the vehicle 102 and other geopositioning data provided by the location service 106, such as, for example, a navigational map GUI display that depicts a graphical indication of the vehicle 102 at its current location with respect to terrain, roads or other geographic features corresponding to that geographic location. That said, in other implementations, the output interface 108 may be realized as a communications system, a transmitter (or transceiver), or other network interface that is capable of transmitting or otherwise providing the current location of the vehicle 102 and other geopositioning data provided by the location service 106 to another device over a communications network, such as, for example, a mobile device or other client electronic device over a wireless local area network, a personal area network, a cellular network, or the like. In this regard, the subject matter described herein is not limited to any particular type, number or configuration of output interfaces 108 or any particular type, number or configuration of actions that may be performed using the current location and other geopositioning data provided by the location service 106.

Figure 2:
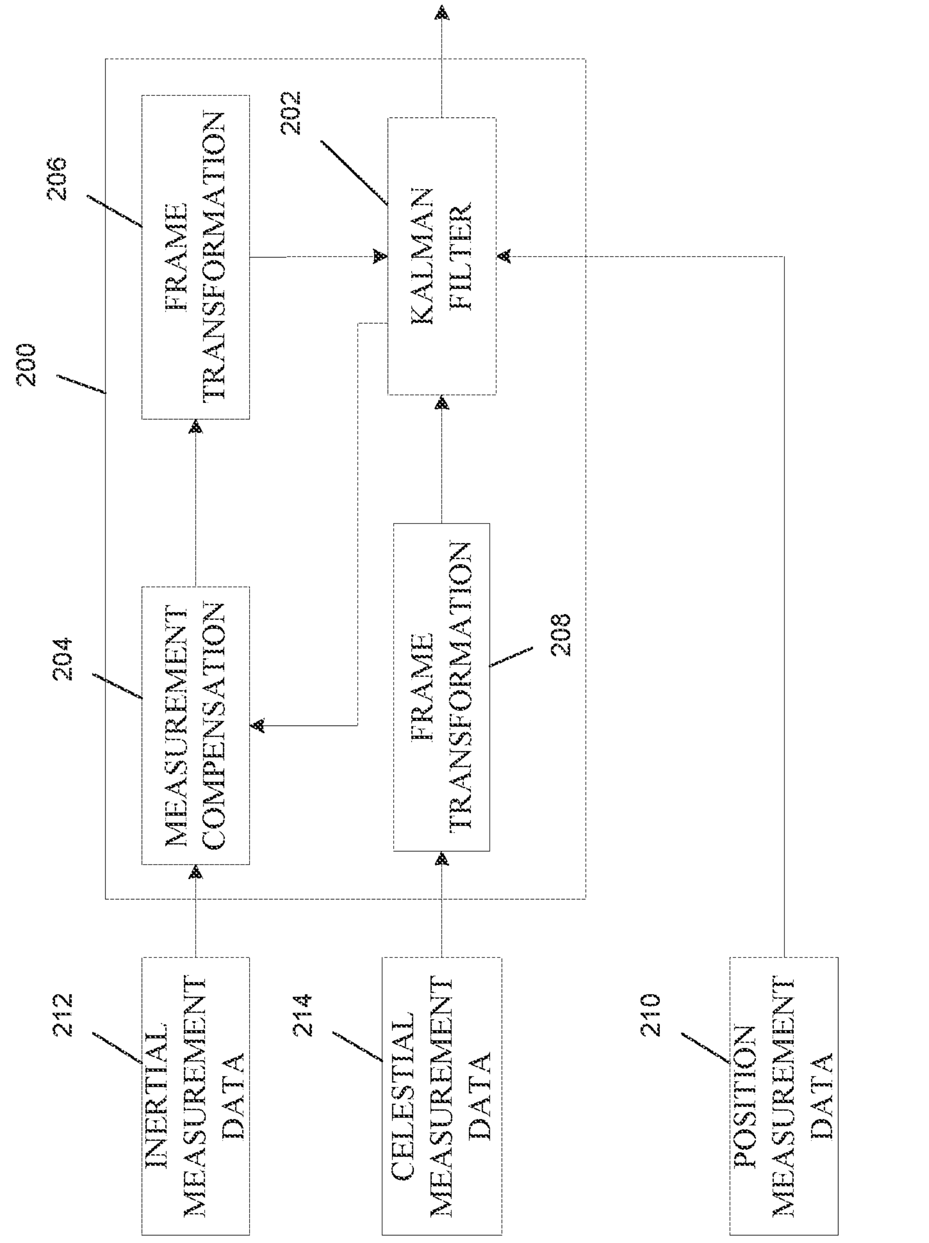
FIG. 2 depicts a block diagram of an exemplary location service suitable for use in the system of FIG. 1 in accordance with one or more implementations.

FIG. 2 depicts an exemplary implementation of a location service 200 suitable for use as the location service 106 in the system 100 of FIG. 1. As described in greater detail below, the location service 200 includes a Kalman filter 202 that is configurable to dynamically determine updated estimates of the current geographic location of the vehicle and other geopositioning data pertaining to the spatial position or orientation of the vehicle (e.g., velocity, attitude, heading, and/or the like) in response to updated celestial measurement data 214 from a celestial measurement system (e.g., celestial measurement system 114) when position measurement data 210 is not currently available from a positioning system (e.g., positioning system 110). In this regard, the Kalman filter 202 may be configurable to receive the position measurement data 210 when available to initialize or update the estimate of the current geographic location of the vehicle that is output by the Kalman filter 202 when the position measurement data 210 is available. That said, when the position measurement data 210 is unavailable, the Kalman filter 202 continually determines updated estimates of the current geographic location of the vehicle in response to updated samples of celestial measurement data 214 using contemporaneous samples of inertial measurement data 212 obtained from an inertial measurement system associated with the vehicle (e.g., inertial measurement system 112).

In exemplary implementations, the location service 200 includes an inertial measurement compensation component 204 that is configurable to receive feedback from the Kalman filter 202 to adjust, modify or otherwise manipulate the raw inertial measurement data to compensate for error, bias and/or the like, as described in greater detail below. In the illustrated implementation, the adjusted inertial measurement data is input or otherwise provided to a frame transformation component 206 that is configurable to transform or otherwise convert the adjusted inertial measurement data from a body coordinate reference frame corresponding to the vehicle to an Earth-centered coordinate reference frame, such as an Earth-centered, Earth-fixed coordinate system, prior to inputting the adjusted inertial measurement data in the Earth-centered coordinate reference frame to the Kalman filter 202. As described in greater detail below, the inertial measurement data input to the Kalman filter 202 is utilized to perform a time update for the Kalman filter 202 (or a prediction phase update) prior to performing a measurement update (or update phase) of the Kalman filter 202.

In the illustrated implementation, the location service 200 also includes another frame transformation component 208 that is configurable to transform or otherwise convert the celestial measurement data 214 into a common reference frame for the Kalman filter 202. In this regard, in some implementations, the frame transformation component 208 transforms or otherwise converts the celestial measurement data from a north-east-down (NED) coordinate system reference frame into a camera reference frame or other reference frame (e.g., a body coordinate reference frame for the vehicle) that may be common across the different types of celestial measurement data 214 independent of the daytime or nighttime mode of operation. For example, in implementations where the cameras or other image sensors associated with the celestial measurement system 114 provide image data in a body coordinate reference frame, the frame transformation component 208 may transform or otherwise convert solar position measurement data indicative of the azimuth and elevation of the Sun from a NED coordinate system reference frame or other Earth-centered reference frame to the body coordinate reference frame or other common reference frame for the cameras or other image sensors associated with the nighttime mode operation of the celestial measurement system 114. That said, in some implementations, the celestial measurement system 114 may be configurable to output solar position measurement data in a body coordinate reference frame or other common reference frame for the cameras or other image sensors, in which case, a separate frame transformation component 208 may be absent from the location service 200.

Figure 3:
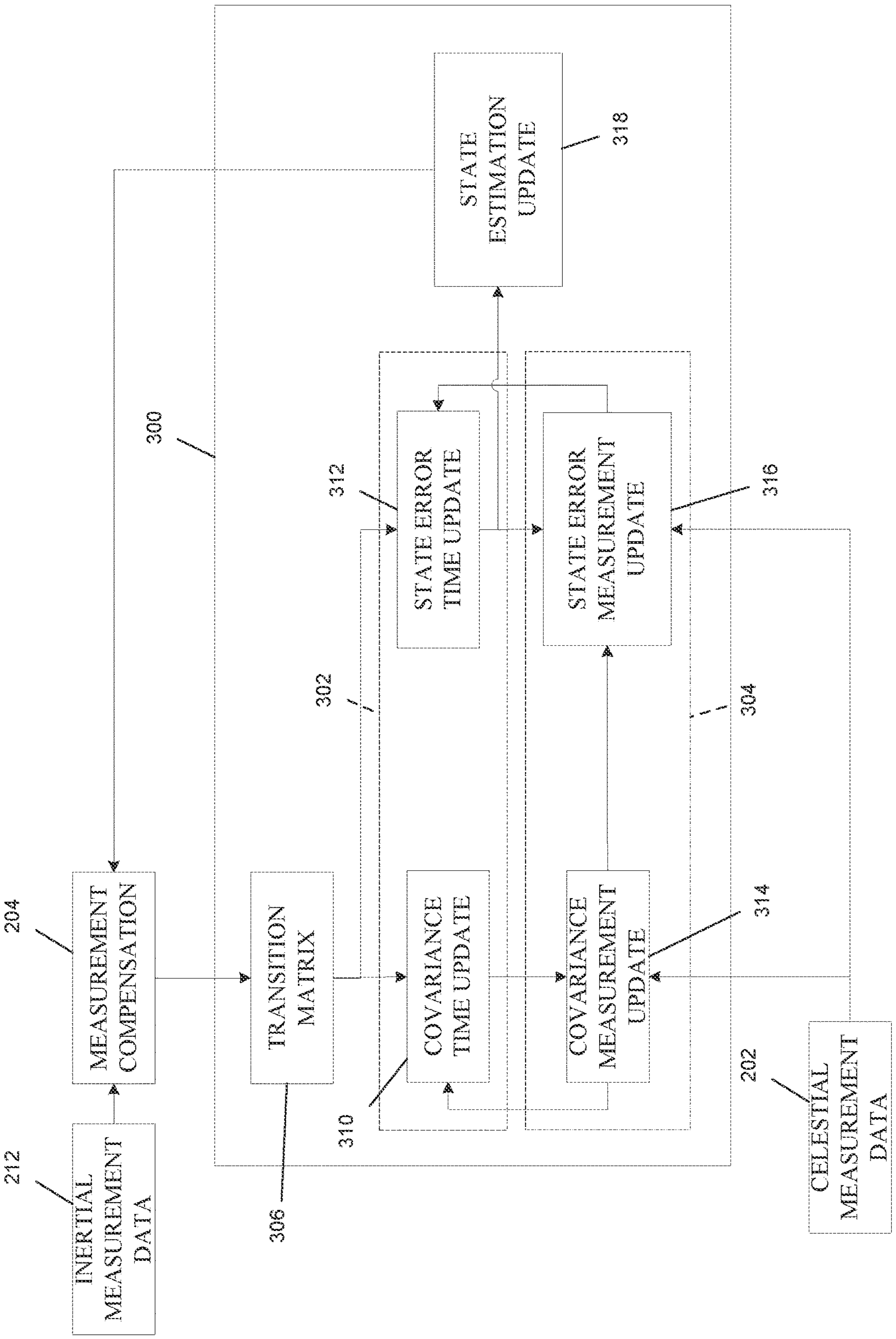
FIG. 3 depicts a block diagram of an exemplary Kalman filter suitable for implementation by the location service of FIG. 2 in accordance with one or more implementations.

FIG. 3 depicts an exemplary implementation of a Kalman filter 300 suitable for use as the Kalman filter 202 in the location service 200 of FIG. 2. The Kalman filter 300 includes a time update stage 302 (or prediction phase) and a measurement update stage 304 (or update phase). In one or more exemplary implementations, the time update stage 302 utilizes only inertial measurement data 212 from an inertial measurement system 112, while the measurement update stage 304 utilizes the celestial measurement data 214 from the celestial measurement system 114.

In the illustrated implementation, the Kalman filter 300 includes a state transition matrix determination component 306 that is configurable to buffer one or more vectors of inertial measurement data (after transformation and compensation) obtained since a preceding update of the state estimation of the Kalman filter 300 into a state transition matrix @, that is input to the time update stage 302. When a new or updated set of celestial measurement data 214 is provided by the celestial measurement system, represented by a celestial measurement vector z, the Kalman filter 300 is configured to trigger the time update stage 302, where a covariance time update component 310 utilizes the state transition matrix to recursively calculate or otherwise determine an updated covariance matrix P as a function of the current covariance matrix and the state transition matrix in accordance with the equation $P=\Phi P\Phi^T+Q$, where Q is a process noise matrix representing the noise associated with the respective sensors of the inertial measurement system. The state error time update component 312 utilizes the state transition matrix to recursively calculate or otherwise determine an updated estimate of the measurement state error vector $\vec{x}$ as a function of the preceding measurement state error vector and the state transition matrix in accordance with the equation $\vec{x}=\Phi\vec{x}$.

After execution of the time update stage 302, the covariance measurement update component 314 of the measurement update stage 304 is triggered using the updated covariance matrix P to determine an updated Kalman gain matrix K in accordance with the equation $K=PH^T(HPH^T+R)^{-1}$, where R represents a matrix of the noise or uncertainty associated with the respective celestial measurement data samples and H represents a measurement mapping matrix characterizing the relationship between the celestial measurement vector $\vec{z}$ and the state difference vector $\vec{x}$. After determining the updated Kalman gain matrix K, the state error measurement update component 316 calculates or otherwise determines an updated estimate of the state error vector $\vec{x}$ as a function of the updated state error vector, the Kalman gain matrix and the celestial measurement vector $\vec{z}$ in accordance with the equation $\vec{x}=\vec{x}+K(\vec{z}-H\vec{x})$. The resulting updated estimate of the state error vector $\vec{x}$ is fed back into the state error time update component 312 for recursively updating the measurement state error vector using the state transition matrix as described above. The updated Kalman gain matrix is also utilized by the covariance measurement update component 314 to recursively calculate or otherwise determine an updated covariance matrix P to be fed back into the covariance time update component 310 for the next iteration of the time update stage 310 as a function of the Kalman gain K in accordance with the equation P=(I−KH)P, where I represents an identity matrix, and H represents the measurement mapping matrix.

The illustrated implementation of the Kalman filter 300 includes a state estimation update component 318 that calculates or otherwise determines an updated estimate of the measurement state ($\vec{X}$) by adding the measurement state error vector to the preceding estimate of the measurement state in accordance with the equation $\vec{X}=\vec{X}+\vec{x}$. The resulting updated estimate of the measurement state includes the most recent or up-to-date estimates of the current location (or position) of the vehicle 102, the current velocity of the vehicle 102, the current attitude of the vehicle 102 and/or the like while accounting for corruption, noise, bias, compensation, and the like. In this regard, the current or most recent estimated values for the location, velocity, attitude and/or other navigational information contained in the estimated measurement state vector ($\vec{X}$) are output or otherwise provided by the location service 200 to a client device or service via one or more output interfaces 108.

After determining the updated estimate of the measurement state, the Kalman filter 300 optionally performs a re-linearization process by reverting the state error vector ($\vec{x}$) back to zero after incorporating the preceding estimate of the measurement state error into the estimate of the measurement state. The updated estimate of the measurement state determined by the state estimation update component 318 is output, fed back, or otherwise provided to the inertial measurement compensation component 204 that utilizes the most recent estimate of the measurement state to adjust, modify or otherwise manipulate the raw inertial measurement data prior to inputting the compensated inertial measurement data to the Kalman filter 300.

The Kalman filter 300 recursively determines an updated Kalman gain to optimally combine the prior state estimates (which were computed using prior inertial and celestial measurement data) with the new celestial measurement data using current or more recent inertial measurement data (after compensation using the prior measurement state estimate) and the noise or uncertainty associated with the new celestial measurement data. The updated Kalman gain is applied to the celestial measurement error corresponding to the difference between the celestial measurement data at the current point in time and a prior estimate of the celestial measurement data for the current point in time to arrive at a current measurement state error vector that captures a current estimated error associated with the location of the vehicle 102, which, in turn, is utilized to determine an updated estimate of the location of the vehicle 102 to be provided to a client as part of the estimated measurement state vector.

Figure 4:
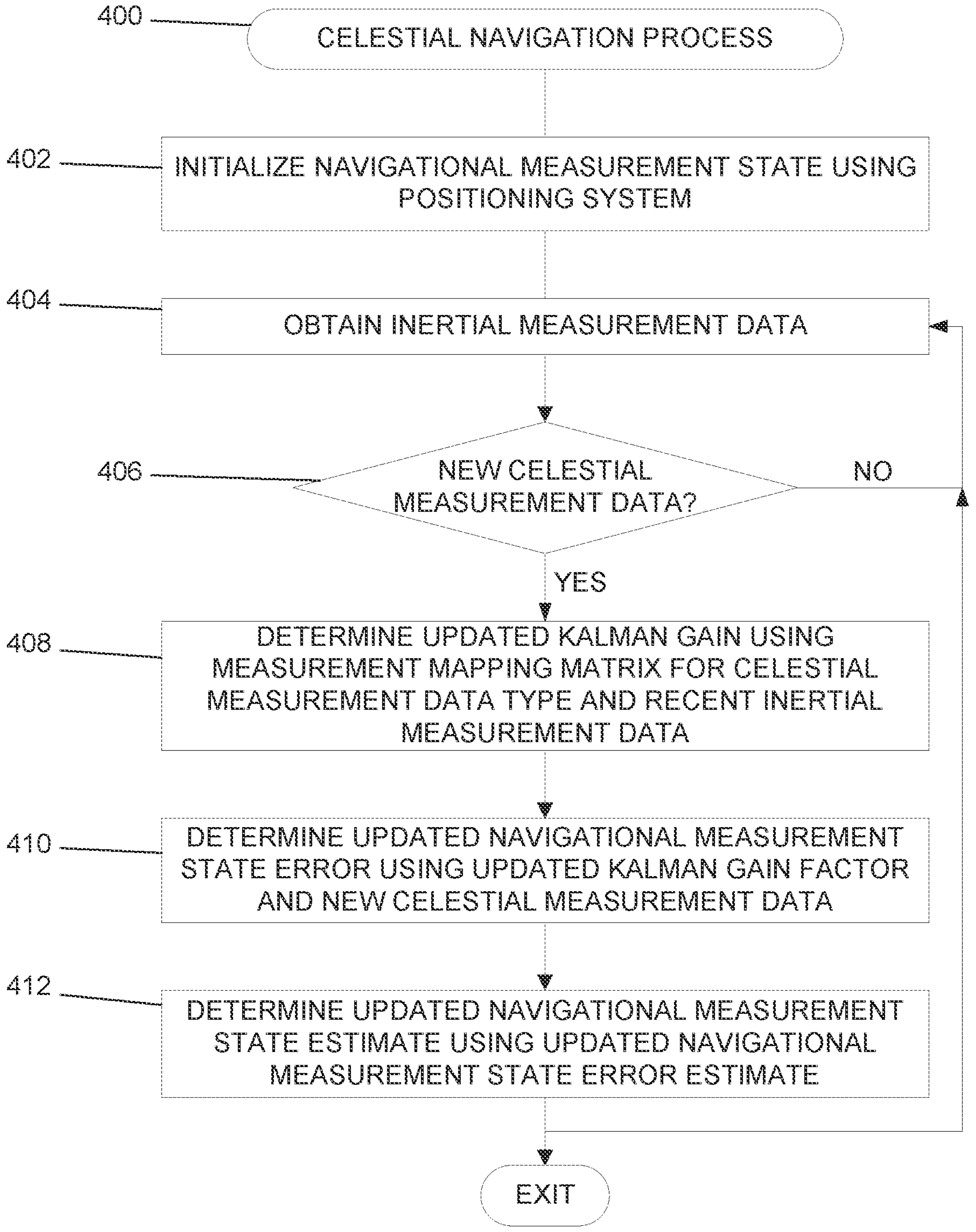
FIG. 4 is a flow diagram of an exemplary celestial navigation process suitable for implementation by a location service in the system of FIG. 1 in accordance with one or more implementations.

FIG. 4 depicts an exemplary celestial navigation process 400 suitable for use with a vehicle or other entity to determine a current location and/or other navigation information without reliance on position measurement data from a positioning system. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the celestial navigation process 400 may be performed by different elements of a vehicle system. That said, exemplary embodiments are described herein in the context of the celestial navigation process 400 being primarily performed by a location service 106 at a processing system 104 associated with a vehicle 102. It should be appreciated that the celestial navigation process 400 may include any number of additional or alternative tasks, the tasks need not be performed in the illustrated order and/or the tasks may be performed concurrently, and/or the celestial navigation process 400 may be incorporated into a more comprehensive procedure or process having additional functionality not described in detail herein. Moreover, one or more of the tasks shown and described in the context of FIG. 4 could be omitted from a practical embodiment of the celestial navigation process 400 as long as the intended overall functionality remains intact.

The illustrated celestial navigation process 400 begins by initializing the navigational measurement state using position measurement data from a positioning system associated with the vehicle or other entity at 402. In this regard, the location service 106 implementing a Kalman filter 202, 300 initializes the navigational measurement state vector (e.g., $\vec{X}$) with the current latitude and longitude coordinates provided by the positioning system 110 along with potentially additional navigational measurement state information provided as part of the position measurement data 210 including, but not limited to, the altitude of the vehicle 102, the heading of the vehicle 102, the velocity of the vehicle 102 and/or the like. In this regard, while real-time position measurement data 210 is available from the positioning system 110, the location service 106 may continually update the navigational measurement state vector using the more recent position measurement data 210 (e.g., by performing a measurement update at the Kalman filter 202, 300) to reflect the most recent position measurement data 210. That said, for purposes of explanation, the subject matter is described herein in the context of celestial navigation during a period of time during which real-time or more recent position measurement data 210 is unavailable.

The celestial navigation process 400 continues by continually receiving or otherwise obtaining inertial measurement data corresponding to motion of the vehicle or entity from an inertial measurement system associated with the vehicle or entity at 404 and buffering the inertial measurement data until new celestial measurement data is obtained from a celestial measurement system associated with the vehicle or entity at 406. For example, in implementations where the inertial measurement system 112 operates at a greater frequency than the celestial measurement system 114, the inertial measurement system 112 may provide multiple sets or vectors of inertial measurement data 212 over the period of time between receiving a set or vector of celestial measurement data 214. In this regard, in exemplary implementations, the different sets of contemporaneous samples of inertial measurement data 212 obtained over the intervening period between celestial measurement updates may be averaged or combined to arrive at a matrix or vector that is representative of the aggregate motion of the vehicle or entity over the intervening period.

In response to new celestial measurement data, the celestial navigation process 400 calculates or otherwise determines an updated Kalman gain based on the recent inertial measurement data over the intervening period before receiving the new celestial measurement data using the measurement mapping matrix for the particular type of celestial measurement data at 408. For example, as described above in the context of FIG. 3, after the measurement compensation component 204 adjusts or otherwise compensates the inertial measurement data obtained over the intervening period using the current navigational measurement state vector to obtain a state transition matrix $\Phi$, the Kalman filter 202, 300 is configured to perform a time update (or prediction update) to recursively calculate an updated covariance matrix, which, in turn is utilized to determine an updated Kalman gain matrix based at least in part on the noise or uncertainty associated with the newly obtained celestial measurement data samples and a measurement mapping matrix characterizing the relationship between the respective type of celestial measurement data samples and the navigational measurement state.

After determining an updated Kalman gain, the celestial navigation process 400 calculates or otherwise determines an updated estimate of the navigational measurement state error (or different) based at least in part on the new celestial measurement data using the updated Kalman gain at 410 and then calculates or otherwise determines an updated estimate of the navigational measurement state using the updated estimate of the navigational measurement state error at 412. For example, as described above in the context of FIG. 3, the state error measurement update component 316 calculates or otherwise determines an updated estimate of the navigational measurement state error (or difference) vector as a function of the updated Kalman gain matrix (K) and the new celestial measurement vector z (e.g., in accordance with the equation $\vec{x}=\vec{x}+K(\vec{z}-H\vec{x})$). The resulting updated estimate of the navigational measurement state error is added or otherwise combined to the preceding estimate of the navigational measurement state to arrive at an updated estimate of the navigational measurement state. In this regard, for the initial iteration of the celestial navigation process 400, the updated estimate of the navigational measurement state error derived from the inertial measurement data and celestial measurement data is added to the initialized navigational measurement state derived from the position measurement data 210 to arrive at an updated estimate of the navigational measurement state. In this regard, the updated estimate of the navigational measurement state may include updated estimates of the current latitude and longitude coordinates of the vehicle 102, an updated estimate of the heading of the vehicle 102, an updated estimate of the velocity of the vehicle 102, an updated estimate of the altitude of the vehicle 102, an updated estimate of the tilts of the vehicle 102, and/or the like that reflect the observed motion of the vehicle 102 derived from the inertial measurement data and the celestial measurement data.

The loop defined by tasks 404, 406, 408, 410 and 412 may repeat indefinitely in the absence of position measurement data 210 to iteratively, recursively and dynamically update the estimated navigational measurement state of the vehicle 102 over time when updated celestial measurement data 214 is obtained to reflect the observed motion of the vehicle 102 derived from the inertial measurement data 212 and the most recent vantage point of the vehicle 102. By using celestial measurement data 214 in concert with the inertial measurement data 212 using the Kalman filter 202, 300, the location service 106 is capable of accurately and reliably estimating the current geographic location, velocity, attitude and/or other navigational state information corresponding to the current pose of the vehicle 102 without reliance on a positioning system 110.

In exemplary implementations, the location service 106 implementing the celestial navigation process 400 supports a daytime operating mode where the celestial measurement data 214 includes atmospheric polarization measurement data indicative of the polarization of the visible light emitted by the Sun within sky or atmosphere above the vehicle 102 from the current vantage point of the vehicle 102 (e.g., a polarimetric heading) along with solar position measurement data for azimuth and elevation of the Sun from the current vantage point of the vehicle 102. Light emitted from the Sun is inherently not polarized until it reaches Earth's atmosphere, where once it reaches the atmosphere, the scattering or polarization of light occurs in a predictable and observable pattern dependent on the elevation and azimuth of the Sun. Accordingly, the atmospheric polarization measurement data and solar position measurement data can be utilized to calculate or otherwise determine an estimated relative heading of the vehicle 102, which, in concert with the inertial measurement data, enables the location service 106 to determine an accurate estimate of the geographic location and other navigational state information for the vehicle 102. For example, in some implementations, the atmospheric polarization measurement data includes or is otherwise utilized to derive an estimated yaw angle of the vehicle 102 based on sky polarization, which, in turn, may be utilized in concert with yaw measurements from the inertial measurement system 112 to more accurately estimate the change in yaw of the vehicle 102 and corresponding change in location, velocity, attitude and/or other navigational states of the vehicle 102 in conjunction with the other inertial measurement data (e.g., roll, pitch and/or other acceleration measurements) and the solar position measurement data.

In one or more implementations, the location service 106 performs the navigational measurement state and covariance updates by the square root implementation known as the Sigma-Rho method. In this implementation, the covariance matrix (P) is factored into a diagonal matrix of standard deviations or sigmas (D) and a correlation matrix (C) containing the correlation coefficients commonly referred to as p on the off diagonals and ones on the diagonals, hence the name Sigma-Rho, in accordance with the equation P=DCD. When the Kalman filter 202, 300 receives measurements, the time update stage 302 updates the state transition matrix and process noise matrix with the appropriate values at the necessary indices, before updating the covariance matrix. The covariance matrix is updated as in the following equations and is then split into its C and D components: $\Phi'=D^{-1}\Phi D$ and $P'=\Phi'C'^{T}+D^{-1}QD^{-1}$, where C and D are updated in accordance with the equation $\vec{\zeta}=\sqrt{\text{diag}(P')}$, where for index i in 2 to n and index j in 1 to i−1, $$C_{ij}^{+}=C_{ji}^{+}=P'_{ij}/\zeta_i\zeta_j,$$

and $D^{+}=D\ \text{diag}(\vec{\zeta})$, and n is the number of states. In measurement updates, the measurement residuals (observed-expected measurements) as well as the H matrix are first computed. These are used to update the state error estimates ($\hat{x}$) and covariance matrix (C and D) in the following manner. An auxiliary variable $\vec{d}_k=HDC$ is computed, followed by an innovation covariance matrix (p) by the equation $p=D\vec{d}_k H^T$. The Kalman gains are computed from $K=D\vec{d}_k p^{-1}$, and the state error estimates are computed as $\vec{x}=\vec{x}+K(\vec{z}-H\vec{x})$. The covariance matrix is updated by first computing the auxiliary variable $$\vec{\epsilon} = \sqrt{1-\vec{d}_k \odot \vec{d}_k p^{-1}},$$

where the symbol $\odot$ indicates element-wise multiplication. The D matrix is updated with $D^{+}=\mathrm{diag}(D\vec{\epsilon})$, while C is updated with $$C^{+}_{ij}=C^{+}_{ji}=\left(C_{ij}-d_{k_i}d_{k_j}p^{-1}\right)\epsilon_i\epsilon_j,$$

with indices i and j taking the same values as above. That said, it should be appreciated the subject matter described herein is not limited to Sigma-Rho method implementations, and may be implemented in an equivalent manner using other Kalman filter implementations, such as those described above in the context of FIG. 3.

When processing yaw updates from the polarization measurement, observe that the measurements are related to the states through:

$$T_N^P = T_E^P T_N^E.$$

Here, T represents a 3×3 transformation matrix, N is the North-East-Down (NED) frame, E is the Earth-Centered-Earth-Fixed (ECEF) frame, and P is the platform frame. Note that $$T_E^P$$

is encoded by the filter attitude states ($\vec{\theta}$), while $$T_N^E$$

is encoded by the filter position states ($\vec{r}^E$). The attitude states are related to yaw by the matrix $$H=\frac{\partial y}{\partial \vec{\theta}}=-\left[\tan p\cos y \quad \tan p\sin y \quad 1\right]T_E^N.$$

Here, p and y are pitch and yaw, respectively. The $$T_E^N$$

matrix is given by $$T_E^N=\begin{bmatrix}-\cos\lambda\sin\phi & -\sin\lambda\sin\phi & \cos\phi\\ -\sin\lambda & \cos\lambda & 0\\ -\cos\lambda\cos\phi & -\sin\lambda\cos\phi & -\sin\phi\end{bmatrix},$$

where $\phi$ and $\lambda$ are latitude, and longitude, respectively. The position states are related to yaw by the matrix $$H=\frac{\partial y}{\partial \vec{r}^E}=\left[\frac{\sin y\tan p}{r_M+h} \quad \frac{\tan\phi-\cos y\tan p}{r_N+h} \quad 0\right]T_E^N,$$

where $\vec{r}^E$ is the ECEF position vector, h is height above the reference ellipsoid, $r_M$ is the meridian radius, and $r_N$ is the prime vertical radius of curvature.

When processing sun measurement updates, consider the unit vector from the vehicle to the sun, written in coordinates of the camera frame. This vector is $$\hat{u}^C=\begin{bmatrix}u_x\\ u_y\\ u_z\end{bmatrix},$$

where C is the camera frame. This vector is computed from $$\hat{u}^C=T_P^C T_E^P T_i^E \hat{u}^i,$$

where i is the Earth-Centered-Inertial (ECI) frame. The sun's position vector is computed from standard methods and û is its unit vector. This unit vector is measured on the sun sensor camera as two spherical coordinates given by $$\vec{Z}=\begin{bmatrix}a\tan 2(u_y, u_x)\\ -a\sin(u_z)\end{bmatrix}.$$

Thus, the attitude states are related to the measurements by the matrix $$H=\frac{\partial \vec{Z}}{\partial \vec{\theta}}=\frac{1}{u_r^2}\begin{bmatrix}-u_x u_z & -u_y u_z & u_r^2\\ -u_y u_r & u_x u_r & 0\end{bmatrix}T_E^C,\ \text{where } u_r^2=u_x^2+u_y^2.$$

Due to the sun's distance, the position states are related to the measurements in a negligible way, such that $$\frac{\partial \vec{Z}}{\partial \vec{r}^E}\approx 0.$$

In exemplary implementations, the location service 106 implementing the celestial navigation process 400 also supports a nighttime operating mode where the celestial measurement data 214 includes one or more astronomical quaternions converting or otherwise translating the observed arrangement of stars or other celestial objects to a corresponding attitude and navigational state based on the known locations of those stars or other celestial objects with respect to Earth. In this regard, the astronomical quaternions are indicative of an estimated attitude and location for the vantage point of the celestial measurement system 114 associated with the vehicle 102, which, in turn, is augmented or otherwise combined with the inertial measurement data 212 by the Kalman filter 202, 300 to arrive at an updated estimate of the current geographic location and attitude of the vehicle 102 based on the observed celestial objects and the inertial movement of the vehicle 102.

For the nighttime operating mode, in exemplary implementations, a camera or other imaging device associated with the celestial measurement system 114 is configured to capture grayscale image data that is filtered or otherwise processed to exclude pixels having an intensity or luminance below an object detection threshold, resulting in a limited subset of pixels representing stars or other celestial objects within the field of view of the camera. After thresholding or filtering the captured image data, a centroiding process is performed to calculate or otherwise determine estimated center locations for pixel intensity among adjacent, neighboring or otherwise contiguous groups of pixels correlative to a common star or celestial object. For example, to find contiguous areas of pixels, individual rows of the captured image data are scanned to identify contiguous sections within a respective row. After a particular row is searched and a contiguous group of pixels within that row have been identified, rows above and below that row are analyzed to determine if there are additional pixels within those rows that are contiguous with areas found in that previously analyzed row. When there are multiple contiguous groups of pixels from different rows, they are merged into one area for centroiding. The centroid location of a respective contiguous group of pixels may be calculated in accordance With un equations $$x_c = \frac{\sum I_i x_i}{\sum I_i}, \text{ and } y_c = \frac{\sum I_i y_i}{\sum I_i},$$

where I represents the respective pixel intensity and x or y is the respective pixel location in the respective direction or dimension of the image frame.

After identifying centroid locations for the respective subsets of pixels satisfying the celestial object detection thresholding criteria, a pyramid technique is used to match the different centroid locations to different known stars or celestial objects. To support the pyramid algorithm, a database of stars (or star catalog) is created that includes a respective identification number for each star and a unit vector for each respective star along with a pair catalog including list of indices and the angles between pairs of stars. For a given pair of centroid locations identified within the captured image data, an estimated distance between the respective centroid locations is calculated or otherwise determined based on their spatial relationship within the captured image data and utilized to identify a corresponding pair of stars within the database having a corresponding separation distance substantially equal to (or within a threshold range of) the estimated distance between centroid locations. After matching or otherwise mapping at least a threshold number of the identified centroid locations to corresponding stars in the database, the respective known unit vectors associated with those stars are input to an attitude estimation algorithm to calculate or otherwise determine an astronomical quaternion indicative of the current attitude of the vehicle 102 in relation to the known location of the identified stars and corresponding covariance matrix, which, in turn, maybe utilized in concert with the inertial measurement data 212 to arrive at an updated estimate of the current location, velocity and attitude of the vehicle 102.

Attitude of the vehicle is directly related to measured attitude of the stellar system. In particular, $$T_i^C = T_P^C T_E^P T_i^E, \text{ where } T_i^C$$

is measured by the stellar system, $$T_P^C$$

is constant and known, $$T_E^P$$

is encoded by the filter attitude states ($\vec{\theta}$), and $$T_i^E$$

can be computed from known time, assuming a real-time clock is available. Given this relationship, the attitude states are related to the stellar attitude by the matrix $$H = \frac{\partial \vec{Z}}{\partial \vec{\theta}} = T_E^i.$$

By virtue of the subject matter described herein, celestial measurement data can be utilized in concert with inertial measurement data to estimate or derive the current geographic location, heading, velocity, attitude and/or other navigational state information for a vehicle or other entity without reliance on positioning systems or other navigational devices or systems. For the sake of brevity, conventional techniques related to navigation, positioning, geolocating, imaging, astronomy, inertial measurement sensors, devices or systems, Kalman filters, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining a location of a vehicle, the method comprising:

obtaining, at the vehicle, celestial measurement data at a current point in time from a celestial measurement system associated with the vehicle, the celestial measurement data including atmospheric polarization measurement data;

obtaining, at the vehicle, inertial measurement data from an inertial measurement system associated with the vehicle at or before the current point in time; and in response to obtaining the celestial measurement data:

determining a Kalman gain based at least in part on the inertial measurement data, a noise associated with the inertial measurement system, a relationship between the celestial measurement data and the location of the vehicle, and an uncertainty associated with the celestial measurement data, wherein determining the Kalman gain comprises:

determining a state transformation matrix (@) based at least in part on the inertial measurement data between a prior point in time associated with a prior estimate of the location of the vehicle and the current point in time; and determining the Kalman gain (K) in accordance with equation $K=D\vec{d}_k p^{-1}$, wherein:

D is a diagonal matrix of standard deviations associated with a Kalman filter associated with the Kalman gain;

$\vec{d}_k$=HDC, where H represents a measurement mapping matrix associated with a relationship between the atmospheric polarization measurement data and the location of the vehicle and Cis a correlation matrix ($C_\rho$) of correlation coefficients associated with the Kalman filter; and p is a covariance matrix represented by equation $p=D\vec{d}_k H^T+R$, where R is a matrix characterizing uncertainty associated with the atmospheric polarization measurement data;

determining a celestial measurement error based at least in part on a relationship between the celestial measurement data at the current point in time and a prior estimate of the celestial measurement data for the current point in time;

determining a current estimated error associated with the location of the vehicle based at least in part on a prior estimated error associated with the location, the Kalman gain and the celestial measurement error; and determining an updated estimate of a current geographic location of the vehicle based at least in part on the current estimated error and a prior estimated location of the vehicle, wherein an action related to operation of the vehicle is performed based on the updated estimate of the current geographic location.

2. The method of claim 1, wherein the celestial measurement data comprises at least one of a polarimetric heading and an estimated yaw angle based on the atmospheric polarization measurement data.

3. The method of claim 1, wherein:

determining the celestial measurement error comprises determining an estimated yaw angle difference based at least in part on a relationship between an estimated yaw angle for the vehicle at the current point in time based on the celestial measurement data and a prior estimate of a yaw angle for the vehicle at the current point in time; and determining the current estimated error comprises determining the current estimated error based at least in part on a product of the Kalman gain and the estimated yaw angle difference.

4. The method of claim 1, wherein:

the celestial measurement data comprises solar position measurement data comprising a current angle between the vehicle and the Sun;

determining the celestial measurement error comprises determining an estimated heading difference based at least in part on a relationship between the current angle at the current point in time and a prior estimate of an angle between the vehicle and the Sun for the current point in time; and determining the current estimated error comprises determining the current estimated error based at least in part on a product of the Kalman gain and the estimated heading difference.

5. The method of claim 4, wherein the angle comprises at least one of an azimuth and an elevation.

6. The method of claim 1, wherein obtaining the celestial measurement data comprises obtaining an astronomical quaternion indicative of a current attitude of the vehicle based on captured image data for a plurality of celestial objects.

7. The method of claim 6, wherein:

determining the celestial measurement error comprises determining an estimated attitude difference based at least in part on a relationship between the current attitude of the vehicle at the current point in time and a prior estimate of an attitude of the vehicle for the current point in time; and determining the current estimated error comprises determining the current estimated error based at least in part on a product of the Kalman gain and the estimated attitude difference.

8. A non-transitory computer-readable medium having computer-executable instructions stored thereon that, when executed by a processing system associated with a vehicle, cause the processing system to: obtain celestial measurement data at a current point in time from a celestial measurement system associated with the vehicle, the celestial measurement data including atmospheric polarization measurement data; obtain inertial measurement data from an inertial measurement system associated with the vehicle at or before the current point in time; and in response to obtaining the celestial measurement data: determine a Kalman gain based at least in part on the inertial measurement data, a noise associated with the inertial measurement system, a relationship between the celestial measurement data and a location of the vehicle, and an uncertainty associated with the celestial measurement data, wherein determining the Kalman gain comprises: determining a state transformation matrix ($\phi$) based at least in part on the inertial measurement data between a prior point in time associated with a prior estimate of the location of the vehicle and the current point in time; and determining the Kalman gain (K) in accordance with equation $K=\vec{D}d_k p^{-1}$, wherein: D is a diagonal matrix of standard deviations associated with a Kalman filter associated with the Kalman gain; $\vec{d_k}$=HDC, where H represents a measurement mapping matrix associated with a relationship between the atmospheric polarization measurement data and the location of the vehicle and Cis a correlation matrix ($C\rho$) of correlation coefficients associated with the Kalman filter; and p is a covariance matrix represented by equation $p=\overrightarrow{Dd_k} H^T+R$, where R is a matrix characterizing uncertainty associated with the atmospheric polarization measurement data; determine a celestial measurement error based at least in part on a relationship between the celestial measurement data at the current point in time and a prior estimate of the celestial measurement data for the current point in time; determine a current estimated error associated with the location of the vehicle based at least in part on a prior estimated error associated with the location, the Kalman gain and the celestial measurement error; and determine an updated estimate of a current geographic location of the vehicle based at least in part on the current estimated error and a prior estimated location of the vehicle, wherein an action related to operation of the vehicle is performed based on the updated estimate of the current geographic location.

9. The computer-readable medium of claim 8, wherein the celestial measurement data comprises at least one of a polarimetric heading and an estimated yaw angle based on the atmospheric polarization measurement data.

10. The computer-readable medium of claim 8, wherein the celestial measurement data comprises an observed value for at least one of an azimuth angle and an elevation angle between the vehicle and the Sun.

11. The computer-readable medium of claim 8, wherein the celestial measurement data comprises an astronomical quaternion indicative of a current attitude of the vehicle based on captured image data for a plurality of celestial objects.

12. A system comprising:

an inertial measurement system to obtain inertial measurement data indicative of motion of a vehicle;

a celestial measurement system to obtain celestial measurement data indicative of a current vantage point of the vehicle at a current point in time, the celestial measurement data including atmospheric polarization measurement data;

an output interface; and a processing system coupled to the inertial measurement system, the celestial measurement system and the output interface, wherein the processing system is configurable to provide a location service to:

determine a Kalman gain based at least in part on the inertial measurement data at or before the current point in time, a noise associated with the inertial measurement system, a relationship between the celestial measurement data and a location of the vehicle, and an uncertainty associated with the celestial measurement data, wherein determining the Kalman gain comprises:

determining a state transformation matrix ($\Phi$) based at least in part on the inertial measurement data between a prior point in time associated with the prior estimate of the location of the vehicle and the current point in time; and determining the Kalman gain (K) in accordance with equation $K=D\vec{d_k}p^{-1}$, wherein:

D is a diagonal matrix of standard deviations associated with a Kalman filter associated with the Kalman gain;

$\vec{d_k}$=HDC, where H represents a measurement mapping matrix associated with a relationship between the atmospheric polarization measurement data and the location of the vehicle and C is a correlation matrix ($C_\rho$) of correlation coefficients associated with the Kalman filter; and p is a covariance matrix represented by equation $p=D\vec{d_k}H^T+R$, where R is a matrix characterizing uncertainty associated with the atmospheric polarization measurement data;

determine a celestial measurement error based at least in part on a relationship between the celestial measurement data at the current point in time and a prior estimate of the celestial measurement data for the current point in time;

determine a current estimated error associated with the location of the vehicle based at least in part on a prior estimated error associated with the location, the Kalman gain and the celestial measurement error;

determine an updated estimate of a current geographic location of the vehicle based at least in part on the current estimated error and a prior estimated location of the vehicle, wherein an action related to operation of the vehicle is performed based on the updated estimate of the current geographic location.

13. The system of claim 12, wherein:

the celestial measurement system comprises a polarization sensor to obtain the atmospheric polarization measurement data corresponding to the current vantage point of the vehicle; and the celestial measurement data comprises at least one of a polarimetric heading and an estimated yaw angle based on the atmospheric polarization measurement data.

14. The system of claim 12, wherein the celestial measurement system comprises at least one imaging device to capture image data comprising one or more celestial objects from the current vantage point of the vehicle.

15. The system of claim 14, wherein the celestial measurement data comprises at least one of an azimuth angle and an elevation angle between the vehicle and the Sun derived from the image data.

16. The system of claim 14, wherein the celestial measurement data comprises an astronomical quaternion indicative of a current attitude of the vehicle based on relative spatial relationships between a plurality of stars identified within the image data.

* * * * *